United States Patent [19]

Salama et al.

[11] Patent Number: 5,135,698
[45] Date of Patent: Aug. 4, 1992

[54] LINING OF PIPELINES USING A CONTINUOUS TUBULAR PULL-THROUGH PLASTIC LINER

[75] Inventors: Mamdouh M. Salama; Louis H. Wolfe; Thomas L. L. Pugh, all of Ponca City, Okla.

[73] Assignee: Conoco Inc., Ponca City, Okla.

[21] Appl. No.: 708,264

[22] Filed: May 28, 1991

[51] Int. Cl.⁵ .............................................. B29C 63/42
[52] U.S. Cl. .................................. 264/229; 29/447; 156/294; 264/28; 264/36; 264/230; 264/269
[58] Field of Search .............. 264/28, 36, 230, 516, 264/249, 229, 570, 573, 231, 269; 29/447; 138/97, 138; 156/287, 294

[56] References Cited

U.S. PATENT DOCUMENTS

| | | | |
|---|---|---|---|
| 3,429,954 | 2/1969 | Atkins et al. | 156/294 |
| 3,959,424 | 5/1976 | Dawson et al. | 264/249 |
| 4,332,073 | 6/1982 | Yoshida et al. | 29/447 |
| 4,377,335 | 3/1983 | Fannon et al. | 29/447 |
| 4,391,028 | 7/1983 | Choudhury et al. | 264/28 |
| 4,496,499 | 1/1985 | Brittain et al. | |
| 4,573,248 | 3/1986 | Hackett | 29/447 |
| 4,818,314 | 4/1989 | Brittain . | |

FOREIGN PATENT DOCUMENTS

| | | | |
|---|---|---|---|
| 52-94376 | 8/1977 | Japan . | |
| 56-39252 | 9/1981 | Japan . | |
| 63-296923 | 12/1988 | Japan . | |
| 89/02814 | 9/1989 | PCT Int'l Appl. | 29/447 |

Primary Examiner—Jan H. Silbaugh
Assistant Examiner—Mathieu Vargot

[57] ABSTRACT

A tubular plastic liner having a coefficient of thermal expansion greater than the coefficient of thermal expansion of a pipeline is cooled to reduce its outside diameter below the inside diameter of the pipeline, which is also cooled, and is then pulled into the pipeline. After the pulling operation is completed the liner and pipeline are allowed to return to normal temperature, whereupon the liner expands to conform to the inside diameter of the pipeline.

12 Claims, 3 Drawing Sheets

5,135,698

LINING OF PIPELINES USING A CONTINUOUS TUBULAR PULL-THROUGH PLASTIC LINER

BACKGROUND OF THE INVENTION

As pipelines and flowlines age, it is inevitable that they will suffer from corrosion damage resulting in leaks. One approach to remedy this problem is to replace the pipeline or flowline, which is costly. Another procedure is to use pull-through polyethylene liners. In this procedure, the liner which has a diameter slightly larger than the internal diameter of the pipeline is pulled through a series of hydraulically powered rollers to reduce the diameter of the liner to something less than that of the metal pipeline. The reduced diameter liner is installed in the pipeline after which tension is released and the liner is allowed to return to its original size, restrained only by the steel pipeline. Because of strength limitations of the liner, it may only be installed in sections up to about 5,000 feet in length depending on the size of the pipe, the severity of twists and bends imposed on the liner during installation and the interior conditions of the pipe.

It is also known to provide a loose fitting plastic liner to extend the life of an existing pipeline. However, such plastic liners are not used in high pressure pipelines since with this procedure an existing pipeline is used simply as a "guide" to receive the loose fitting plastic insert. The loose fitting insert once installed in the pipeline serves as a new "pipeline"; the insert conveys the material formerly conveyed by the pipeline but in so doing must be capable of withstanding whatever pressures may be required to transport material therethrough. Such loose fitting plastic inserts are unsuitable for use in high pressure pipelines because they are not capable of withstanding the stress encountered when the interior region of the liner is pressurized forcing the liner to expand radially toward the internal walls of the pipeline.

In still another procedure, an expandable tubular plastic liner such as a polyethylene liner having an outside diameter less than the inside diameter of a pipeline is pulled into a pipeline. Subsequently, the liner is subjected to heated and pressurized fluids so as to emplace it firmly against the interior of the pipe.

It would be desirable to provide an improved process for the installation of plastic liners in pipelines or flowlines where a continuous pull-through procedure may be used.

THE PRIOR ART

U.S. Pat. Nos. 4,496,499 and 4,818,314 to Brittain et al. disclose placing a tubular plastic liner such as a polyethylene liner into a pipeline to be relined. The plastic liner which has an outside diameter smaller than the inside diameter of the pipeline is pulled into the pipeline and then subjected to heated and pressurized fluids so as to emplace it firmly against the interior of the pipe. The references further disclose longitudinally stretching the liner within the pipeline, installing a flange at each end and then releasing the tension in the liner so as to fix the liner in position against longitudinal movement.

Japanese Pat. Nos. 52-94376 and 81-39252 to Bussan disclose the use of thermally contractive or shrinking pipe used for covering joints in pipes such as steel pipe joints of gas, oil and water pipelines. In the process, the thermally contractive or shrinking pipe is placed over the joint to be covered and is held with two chucks, one at each end. The section of pipe between the chucks is then heated while both chucks are drawn oppositely to each other to extend the polyolefin longitudinally. The polyolefin pipe is then cooled to room temperature without moving the chucks and thereby contracted to closely cover the joint.

Japanese Pat. No. 63-296923 to Tobu Cleaner Service discloses a lining made of polyethylene or polyvinyl chloride which is inserted into a pipe to be lined. An elastic bag of high heat resistance and permeability is pulled inside the lining. The bag has an opening near the end and a hose is fitted into the other end through which hot water or steam is introduced into the bag to press the lining against the inside of the pipe where it adheres and is cured by cooling.

THE INVENTION

In carrying out the process of the invention, a tubular plastic liner is used which has a coefficient of thermal expansion greater than the coefficient of thermal expansion of the pipeline into which it is introduced as a liner. The plastic liner which has an outside diameter greater than the inside diameter of the pipeline at ambient temperature and the temperature of operation of the pipeline is cooled to reduce its outside temperature to less than the inside diameter of the pipeline which is also cooled and then pulled into the pipeline. When the pulling step is complete, the cooling of the plastic liner and pipeline is discontinued, thereby allowing the liner to warm and expand and conform to the inside diameter of the pipeline.

DETAILED DESCRIPTION OF THE INVENTION

The process of the invention is particularly applicable to relining pipelines on land since such pipelines usually have long stretches which do not contain sudden turns such as 90° bends. In the process of the invention, the plastic liner is not stretched in any way and is subjected only to the stress required to pull the liner through the pipeline. Because of this, the process may be used to install liners in very long lengths of pipeline up to several miles or longer even with pipelines up to 10" or larger in diameter. Thus, the process has substantial advantage over other processes in which only a limited length of liner may be installed in a pipeline.

Even in offshore installations, the process of the invention may be used to install a plastic liner in a pipeline of several miles of length by unflanging the pipeline at the ocean floor and pulling the liner through the relatively straight section of pipeline from the platform to the shore. The vertical section of the pipeline extending from the surface to the ocean floor can then separately be lined utilizing the process of the invention.

Figure 1:
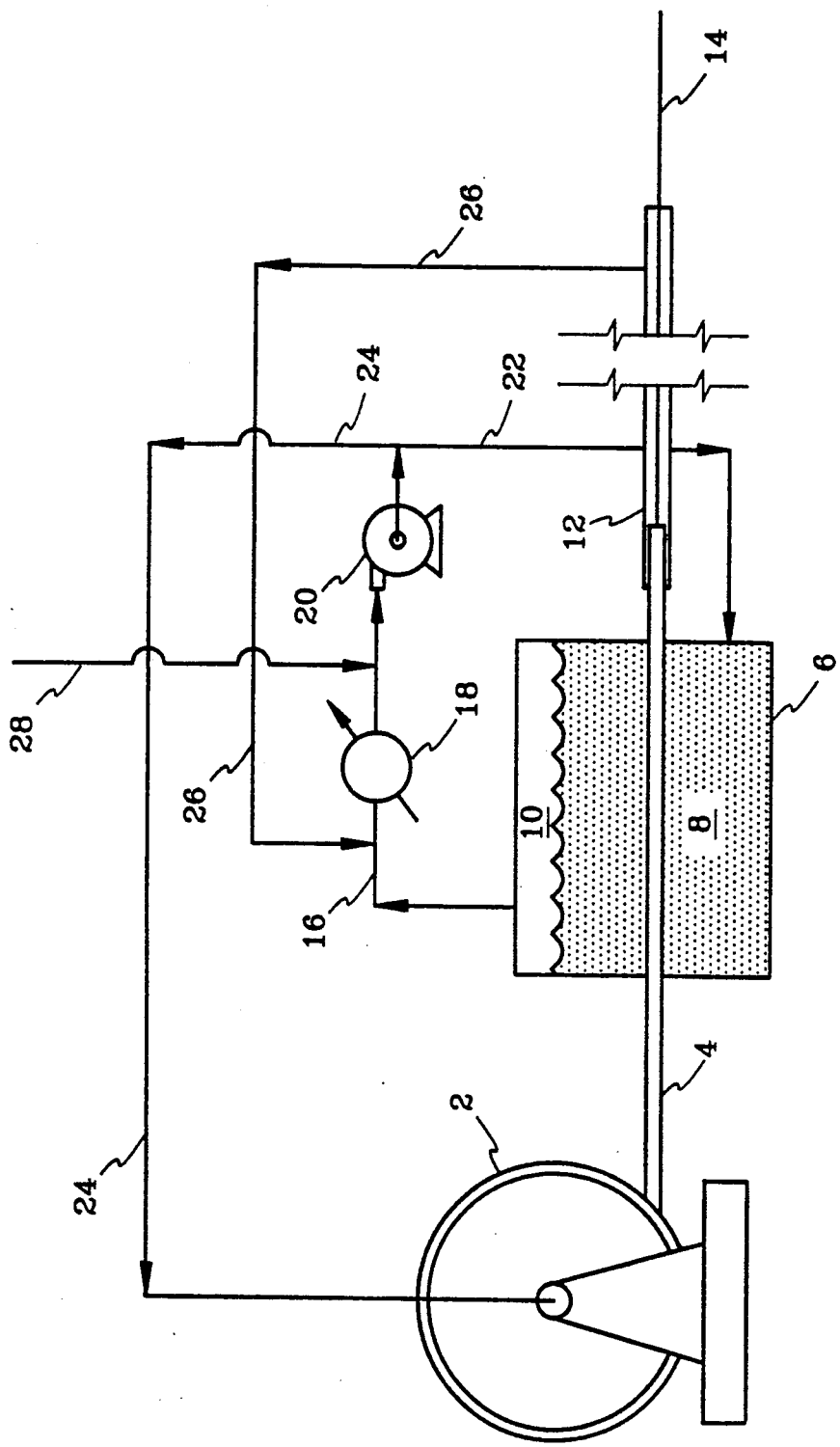
FIG. 1 is a schematic diagram in cross section of an apparatus for carrying out the process of the invention in which a tubular plastic liner is removed from a spool, passed through a cooling zone and then introduced into a pipeline.

The process of the invention is best described by reference to the drawings. Referring to FIG. 1, a tubular polyethylene liner 4 is withdrawn from spool 2 and passed through a cooling bath 8 into pipeline 12. Movement of liner 4 into pipeline 12 is effected by the use of a pulling cable 14 which is attached to a powered winch (not shown). Under ambient temperature conditions, and also the temperature of operation of the pipeline, liner 4 has an outside diameter which is greater than the inside diameter of pipeline 12. Pipeline 12 which is normally constructed of steel has a coefficient of thermal expansion which is substantially smaller than the coefficient of thermal expansion of the polyethylene liner. Sufficient cooling is provided in cooling bath 8 so that the outside diameter of liner 4 is reduced to below the inside diameter of pipeline 12.

The uncooled outside diameter of liner 4 is larger than the inside diameter of pipeline 12 so that the cooled liner when allowed to return to ambient temperature will expand and conform to the inside diameter of the pipeline and thereby provide a tight fit. Such conformance may be provided by the use of a liner having a minimum diameter of about 0.02" larger than the inside diameter of the pipeline.

The degree of cooling required to reduce the outside diameter of the liner below the inside diameter of the pipeline by a sufficient amount to allow the liner to be pulled into and through the pipeline is determined by the following equation.

$$\Delta T = \frac{R}{D \times (C_L - C_P)}$$

where
$\Delta T$ = amount of cooling of the liner - °F.
R = reduction in the outside diameter of the liner - inches
$C_L$ - coefficient of thermal expansion of the liner - in/in-°F.
$C_P$ coefficient of thermal expansion of the steel pipeline - in/in-°F.

Assuming a 10 inch inside diameter pipeline and a polyethylene plastic liner having a 10.02 inch outside diameter at ambient temperature and a 9.9 inch outside diameter when cooled for drawing into the pipeline, the above equation would be:

$$\Delta T = \frac{0.02 + 0.10}{10 \times (11.1 \times 10^{-5} - 0.6 \times 10^{-5})}$$

$$\Delta T = 115° F.$$

With the same assumption and a 20 inch inside diameter pipeline the amount of cooling required would be 58° F.

As stated previously, the liquid 8 contained in cooler 6 is maintained at a suitable low temperature to provide the cooling required to reduce the outside diameter of the liner to the desired size. The coolant liquid 8 may have a boiling point at the desired temperature level of the bath. If so, as heat is released from the liner into the cooling bath portion of the cooling liquid will vaporize entering vapor space 10. As this vapor accumulates, it passes from cooling tank 6 through line 16 and into a suitable condenser 18 from which it is removed through pump 20 and returned to cooling tank 6 through line 22.

As an alternate, a suitable compressor and condenser may be provided in lieu of cooler 18.

In order to maintain the reduced temperature of liner 4 as it is passed further into pipeline 12, a portion of the cooling liquid leaving pump 20 is passed through line 24 and introduced to the end of the liner contained on spool 2. This coolant passes through liner 4 and into pipeline 12 through suitable openings in liner 4 adjacent the point at which cable 14 is attached to the liner. The coolant pressure in the liner increases its stiffness which promotes unwinding off the spool. This in turn creates a pushing force which facilitates movement of the liner inside the pipeline.

As the coolant passes through pipeline 12 and cools the pipeline a portion of the coolant is converted to vapor. In the initial stages of the operation, all of the coolant reaching the terminus of the pipeline may be in the vapor form. The cooling liquid and/or vapor exiting the pipeline terminus is returned to the system through line 26 and enters cooler 18 where the vapor is recondensed. If the pipeline is of great length, it may be necessary to provide booster compressors and associated pumps and condensers at various points along line 26. Where compressors are employed, it is necessary to provide suitable accumulators (not shown) for separating liquid and vapor before the vapor is introduced to the compressors. A liquid level is maintained in cooling tank 6 by introducing make-up cooling liquid through line 28. This make-up liquid establishes the liquid level in tank 6 at the beginning of the process and maintains this level during operation of the system.

As liner 4 is pulled further and further into pipeline 12, all of the pipeline gradually becomes cooled to the desired temperature such that a greater percentage of the material leaving the pipeline terminus through line 26 is in the liquid state.

After liner 4 is completely pulled through pipeline 12, the flow of cooling liquid is terminated and cooling liquid remaining in the liner is removed either by following this liquid with another warmer liquid or by blowing out the liner with air or another suitable gas. Small bleeder holes (not shown) are provided at each end of pipeline 12 and if desired at certain intermediate points in the pipeline.

After the cooling liquid is removed and the liner begins to warm, it expands and eventually conforms to the inside diameter of the pipeline to provide a tight fit. During the expansion any cooling liquid or gas contained in the annular space between the inside of the pipeline and the outside of the liner is forced through the bleeder holes. After flow of this material has terminated, the bleeder holes are plugged in a suitable manner.

Figure 2:
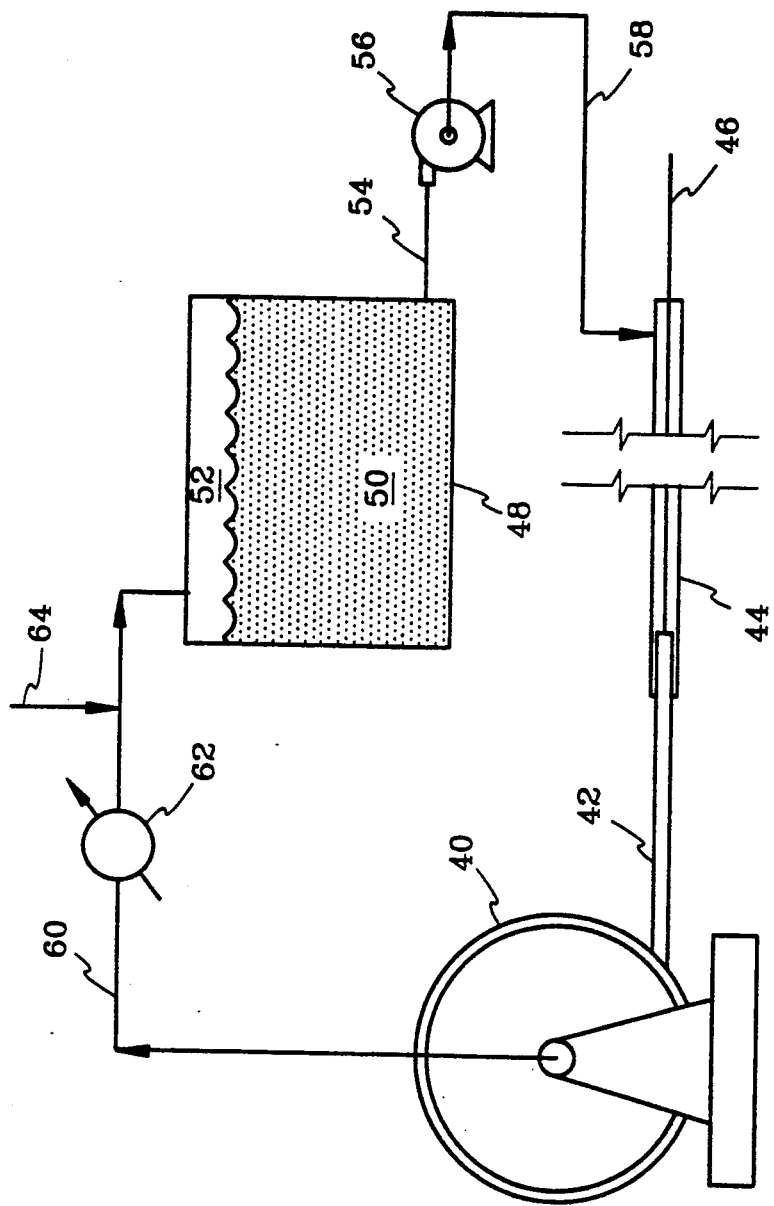
FIG. 2 is schematic diagram of an apparatus for carrying out the process of the invention in which a spooled tubular plastic liner is introduced to a pipeline and cooling of the liner is provided by passing a cooling fluid through the pipeline and the liner.

Another scheme for carrying out the process of the invention is shown in FIG. 2. In this Figure, a tubular plastic liner 42 is removed from spool 40 and pulled through pipeline 44 by cable 46 in a similar manner to that described in FIG. 1. The cooling liquid required to reduce the outside diameter of the liner is removed from a body of liquid 50 in cooling tank 48 through line 54 and passed through pump 56 and line 58 into the terminus of pipeline 44. The cooling liquid proceeds through pipeline 44 until it meets the end of liner 42. It enters the liner through suitable openings and passes through the entire liner contained on spool 40 exiting from the liner through line 60. At the beginning of the process, most or all of the liquid entering line 60 may be converted to vapor from heat picked up in the pipeline and the liner.

Any vapor passing through line 60 or mixture of vapor and liquid is cooled and condensed in cooler 62 and returned to the vapor space 52 of cooling tank 48. As in the arrangement of FIG. 2, a suitable compressor and condenser may be substituted for cooler 62. When the material in line 60 is a mixture of liquid and vapor, a suitable accumulator or other means (not shown) is provided to separate the liquid from the vapor when the vapor is passed to a compressor. The desired liquid level in cooling tank 48 is maintained by introducing make-up cooling liquid through line 64. This make-up liquid establishes the liquid level in tank 48 at initiation of the process and maintains this level to accommodate any movement of liquid within the system or any losses of liquid from the system.

After liner 42 has been completely pulled into and through the pipeline 44, the flow of cooling liquid is terminated and the cooling liquid is removed from the liner in a suitable manner allowing the liner to warm to ambient temperature. Here again, bleed holes are provided at suitable points in the pipeline to allow any air and cooling liquid to escape from the annulus between the inside of the pipeline and the outside of the liner during warmup of the liner. After the liner reaches ambient temperature, it conforms to the inside of the pipeline to provide a tight fit. When no more liquid or vapor has issued from the bleed holes, the bleed holes are plugged and the pipeline is prepared for testing and operation.

Figure 3:
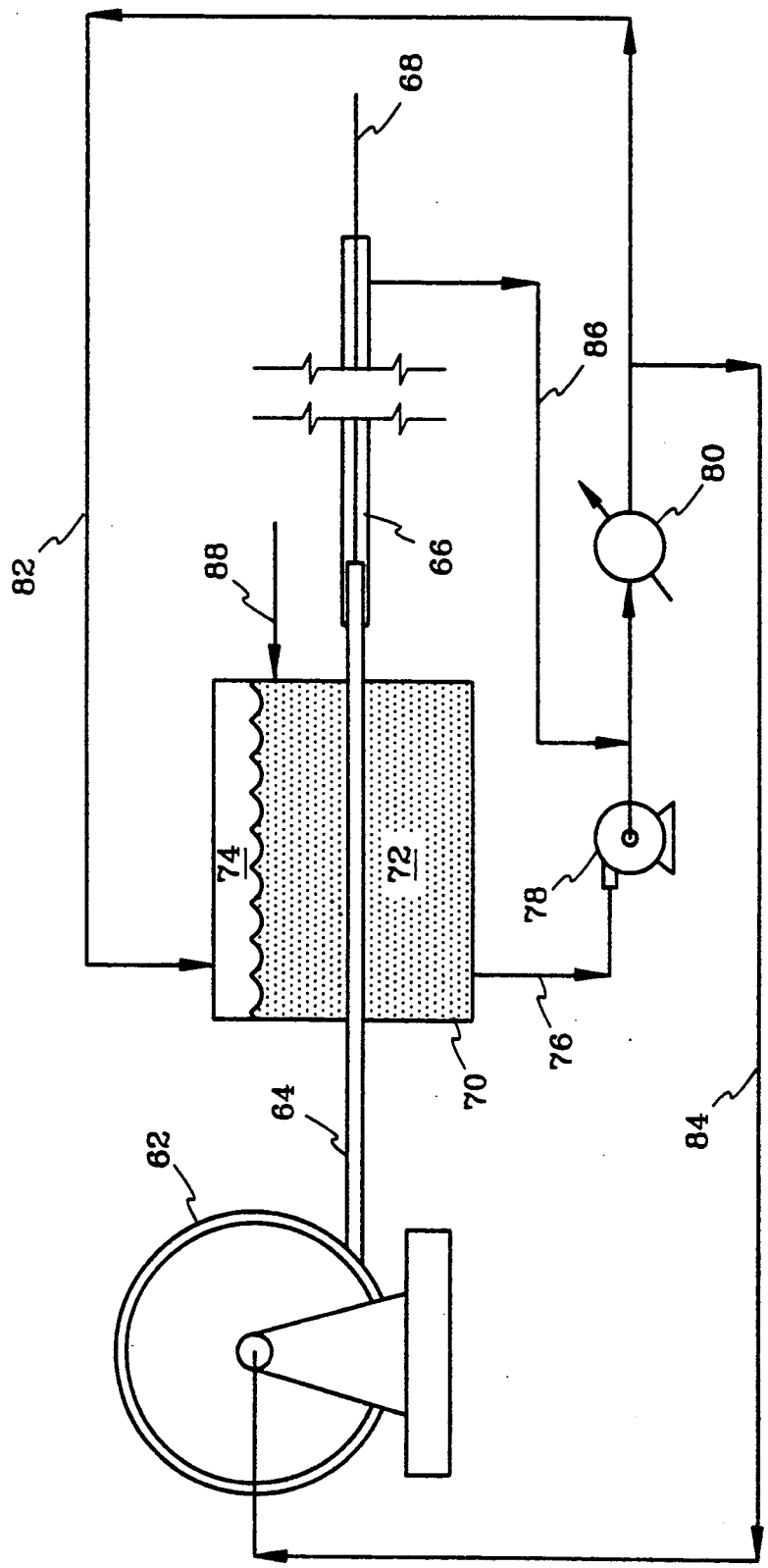
FIG. 3 is a schematic diagram of an apparatus similar to that shown in FIG. 1.

Still another procedure for carrying out the process of the invention is shown in FIG. 3. In this procedure, the cooling liquid 72 contained in cooling tank 70 is maintained under conditions of temperature and pressure so that the cooling liquid does not vaporize during any stage of the process. Referring to FIG. 3, a tubular plastic liner 64 is withdrawn from spool 62 and passed through cooling tank 70 and introduced to pipeline 66. The liner is pulled through pipeline 66 by a cable 68 in the same manner as described in the previous procedures. Liquid coolant at the desired temperature is removed from cooling tank 70 line 76 and passed through pump 78 and cooler 80 wherein sufficient cooling is provided to maintain the desired temperature in the cooling tank. A portion of the coolant is returned to the cooling tank through line 82 and the remainder is passed through line 84 into the coiled liner. From there it enters and passes through the entire liner and exits through suitable openings into pipeline 66. Liquid coolant is removed from the terminus of pipeline 66 through line 86 and is returned to cooler 80 where the temperature is reduced to the desired level. In order to provide a liquid level in cooling tank 70 and maintain this level during operation of the process, make-up coolant is introduced through line 88. This flow of coolant also provides for any losses of coolant from the system. The vapor space 74 above coolant 72 in cooling tank 70 may be filled with a suitable inert gas or may be vented to the atmosphere if desired.

The liners used in carrying out the process of the invention, may be constructed of any suitable plastic material. Included but not limiting are the materials which are listed in the following table.

TABLE 1

| Plastic Material | Coefficient of Thermal Expansion - in/in - °F. |
|---|---|
| Polyetherimide | $90.0 \times 10^{-5}$ |
| Silicone | $43.3 \times 10^{-5}$ |

TABLE 1-continued

| Plastic Material | Coefficient of Thermal Expansion - in/in - °F. |
|---|---|
| Fluorocarbon - PTFE | $30.0 \times 10^{-5}$ |
| Polystyrene | $20.7 \times 10^{-5}$ |
| Polyethylene (LDPE) | $18.0 \times 10^{-5}$ |
| Polyurethane | $17.0 \times 10^{-5}$ |
| Polyether | $16.3 \times 10^{-5}$ |
| Epoxy | $14.9 \times 10^{-5}$ |
| Polyetheretherketone | $14.0 \times 10^{-5}$ |
| Polyester | $12.2 \times 10^{-5}$ |
| Polyethylene (HDPE) | $11.1 \times 10^{-5}$ |
| Polypropylene | $11.0 \times 10^{-5}$ |
| ABS | $9.5 \times 10^{-5}$ |
| Polyester Polycarbonate | $8.3 \times 10^{-5}$ |
| Polyamide - Nylon | $8.3 \times 10^{-5}$ |
| Polyethylene | $6.0 \times 10^{-5}$ |
| Phenolic | $5.5 \times 10^{-5}$ |
| Polycarbonate | $4.4 \times 10^{-5}$ |
| Polyvinyl Chloride | $3.8 \times 10^{-5}$ |

Any of the above plastics or combinations thereof may be used in the liners of the process of the invention. The values given in the table are for pure plastic materials, however, plastics in general may be engineered with variable properties by the use of fillers. For example, the coefficient of thermal expansion of high density polyethylene (HDPE) may be varied from as low as $1.6 \times 10^{-5}$ to as high as $11.1 \times 10^{-5}$ inches/inch - °F., depending on the types and amount of additives combined with this plastic material.

As used herein, the term plastic is intended to include any synthetic material either elastomers or nonelastomers which may be formed into a tubular liner and pulled through a pipeline.

The plastic liners will usually have a coefficient of thermal expansion not less than five times the coefficient of thermal expansion of steel, which is $0.6 \times 10^{-5}$ in/in- °F. The coefficient of thermal expansion for the plastic liners may vary from as low as $3.0 \times 10^{-5}$ inches-/inch - °F. to as high as $90 \times 10^{-5}$ inches/inch - °F. or higher. The thickness of the plastic liner is not critical, however, it must be thick enough to withstand the tensile stress imparted to the liner during the process of pulling it into the pipeline. Usually, the plastic liner will have a thickness of about one quarter of an inch or greater depending on the material of construction and the diameter of the liner.

As stated previously, the liner may be continuously installed in very long lengths of pipeline. Since there is stress imposed on the liner by the friction of the pipeline and the weight of the liner being pulled into the pipeline, the total length of liner that can be installed in a given pipeline is limited to not exceeding the tensile strength of the liner. Under ordinary circumstances, the liner may be pulled into and through several miles or more of pipeline. If desired, a lubricant may be placed on the outside of the liner to aid in its progress through the pipeline. If the pipeline is used for the transfer of liquid hydrocarbon, residual hydrocarbon in the pipeline may also serve as a lubricant. While the liner will ordinarily be stored for use on a spool or series of spools, it is within the scope of the invention to lay out the liner in other ways for entry into the pipeline.

While the process of the invention will normally be used for installing plastic liners in existing pipelines and in particular those which have been used for an extended period of time, it is also within the scope of the invention, to install plastic liners in new pipelines. This latter procedure may be particularly desirable where the pipeline is to be installed between the shore and an offshore platform.

A variety of cooling liquids may be used in carrying out the process of the invention. Suitable, but not limiting examples are given in the following table.

TABLE 2

| Cooling Liquid | Temperature* - °F. |
| --- | --- |
| NaCl solution + ice | −5.8 |
| CaCl$_2$ solution + ice | −67.0 |
| CH$_4$ | −258.7 |
| C$_2$H$_6$ | −127.5 |
| C$_3$H$_8$ | −43.6 |
| C$_2$H$_5$OH + dry ice | −97.6 |
| Nitrogen | −320.8 |

*at atmospheric pressure

The plastic liner is pulled into and through the pipeline with a rope such as KEVLAR® or a suitable wireline, for example, a steel cable. The pulling power is provided by a winch or other suitable means. Attachment of the pulling rope or cable to the plastic liner may be made by the use of any suitable means shown in the art. Examples of such attachment means are shown in U.S. Pat. No. 4,818,314 which is hereby incorporated by reference.

Once the plastic liner is expanded to conform to the inside of the pipeline, it is effectively fixed in position and may be cut off or otherwise terminated adjacent to the flanges of the pipeline or pipeline section. If desired, the installed liner may be flanged at each end. When the plastic liner is to be installed in an existing pipeline, it may be desirable to first pass a pig through the pipeline to assure that the pipeline is open in all sections to receive the plastic liner. A second pig containing a plurality of wire bristles may be used to scrape off any build-up of scale or other material from the internal surface of the pipeline. A third pig such as a rubber cupped cleaning pig may be used to carry out the pipeline slag or scale broken off the pipeline walls by the first two pigs. Suitable pigs are well known and are available commercially. Examples of such pigs are disclosed in U.S. Pat. No. 4,818,314 previously referred to.

Before inserting the plastic liner into the pipeline, it may be desirable to pull a test section of liner through the entire pipeline to assure that the liner may be installed without excessive surface damage to the liner.

As stated previously, the plastic liner has an outside diameter which is greater than the inside diameter of the pipeline at ambient temperature conditions and also at the temperature of operation of the pipeline. Ambient temperature conditions are the conditions which prevail when the pipeline is not in use, for example, when the pipeline is shut down. Since the temperature at ambient conditions may vary depending on the time of the year, the plastic liner must be sized so that it has an outside diameter greater than the inside diameter of the pipeline at the lowest ambient temperature. Furthermore, the plastic liner must be sufficiently large to have an outside diameter greater than the inside diameter of the pipeline at the lowest temperature at which the pipeline operates.

While certain embodiments and details have been shown for the purpose of illustrating the present invention, it will be apparent to those skilled in the art that various changes and modifications may be made herein without departing from the spirit or scope of the invention.

We claim:

1. A process for lining a pipeline which comprises:
   (a) drawing into the pipeline a tubular plastic liner having at ambient temperature and the temperature of operation of the pipeline an outside diameter greater than the inside diameter of the pipeline; said liner having a coefficient of thermal expansion greater than the coefficient of thermal expansion of the pipeline;
   (b) cooling the liner and pipeline by passing a cooling liquid therethrough during the drawing step to reduce the outside diameter of the liner to less than the inside diameter of the pipeline; and
   (c) discontinuing cooling of the liner and pipeline when the drawing step is complete, thereby allowing the liner to expand and conform to the inside diameter of the pipeline.

2. The process of claim 1 in which the liner after expansion is flanged at each end.

3. The process of claim 1 in which the outer diameter of the liner at ambient temperature and at the temperature of operation of the pipeline is at least 0.02 inches greater than the inside diameter of the pipeline.

4. The process of claim 3 in which the outside diameter of the liner after cooling is at least 0.10 inches less than the inside diameter of the pipeline.

5. The process of claim 4 in which the thermal coefficient of expansion of the liner is at least five times as great as the coefficient of thermal expansion of the pipeline.

6. A process for lining a steel pipeline which comprises:
   (a) drawing into the pipeline a tubular plastic liner having at ambient temperature and the temperature of operation of the pipeline an outside diameter greater than the inside diameter of the pipeline, said liner having a coefficient of thermal expansion greater than the coefficient of thermal expansion of the pipeline;
   (b) contacting the liner and pipeline with a cooling liquid during the drawing step to reduce the temperature of the liner and pipeline and thereby reduce the outside diameter of the liner to less than the inside diameter of the pipeline; and
   (c) discontinuing cooling of the liner and pipeline when the drawing step is completed thereby allowing the liner to expand and conform to the inside diameter of the pipeline.

7. The process of claim 6 in which the cooling liquid is selected from the group consisting of Nacl solution plus ice, cacl$_2$ solution plus ice, Ch$_4$, C$_2$H$_6$, C$_3$H$_8$, C$_2$H$_5$OH plus dry ice and nitrogen.

8. The process of claim 6 in which the plastic liner is constructed of materials selected from the group consisting of: polyetherimide, silicone polymers, fluorocarbon polymers, polystyrene, low density polyethylene, polyurethane, epoxy, polyetheretherketone, high density polyethylene, polypropylene, ABS, polyamide, phenolic, polycarbonate and polyvinyl chloride.

9. The process of claim 6 in which the outer diameter of the liner at ambient temperature and at the temperature of operation of the pipeline is at least 0.02 inches greater than the inside diameter of the pipeline.

10. The process of claim 9 in which the diameter of the liner after cooling is at least 0.10 inches less than the inside diameter of the pipeline.

11. The process of claim 10 in which the cooling liquid is selected from the group consisting of NaCl solution plus ice, $CaCl_2$ solution plus ice, $CH_4$, $C_2H_6$, $C_3H_8$, $C_2H_5OH$ plus dry ice and nitrogen.

12. The process of claim 11 in which the liner is constructed from materials selected from the group consisting of: polyetherimide, silicone polymers, fluorocarbon polymers, polystyrene, low density polyethylene, polyurethane, epoxy, polyetheretherketone, high density polyethylene, phenolic, polycarbonate and polyvinyl chloride.

* * * * *